June 27, 1933.  C. M. GERE  1,915,489
INSERTER FOR PLACING MOLDED CHEESE IN CONTAINERS
Filed March 19, 1931
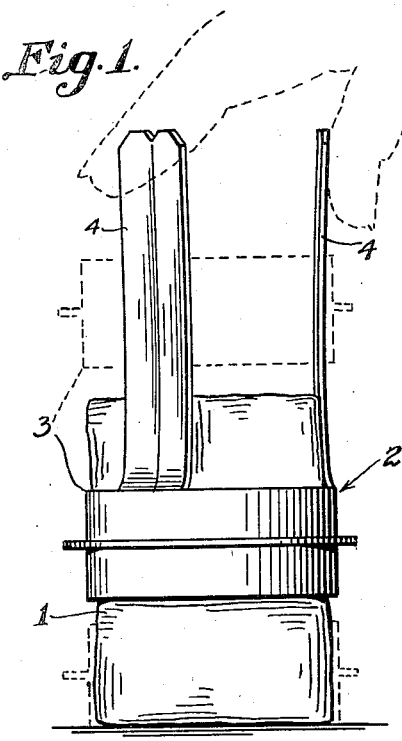
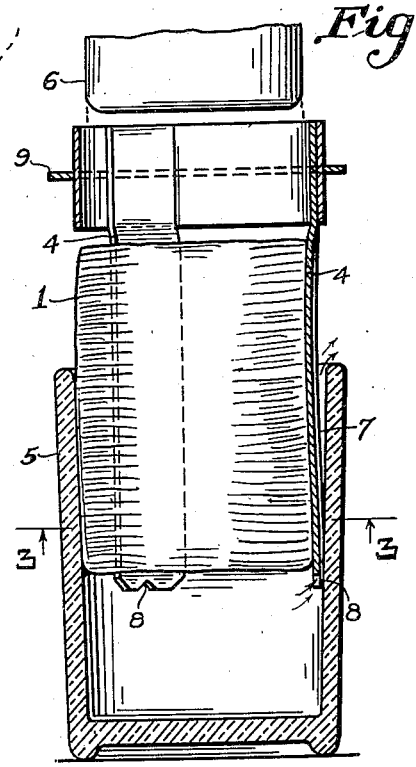
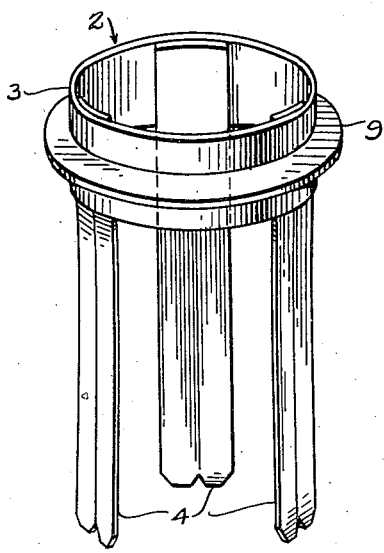
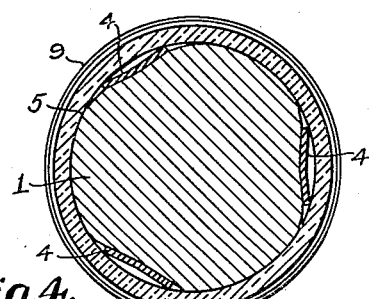
Inventor
Clair M. Gere
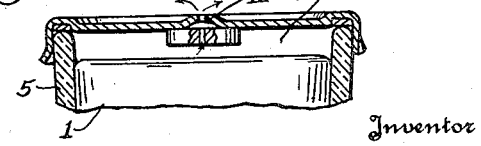
Attorneys Patented June 27, 1933

1,915,489

UNITED STATES PATENT OFFICE

CLAIR M. GERE, OF BELFAST, NEW YORK, ASSIGNOR TO NATURAL CHEESE CORPORATION, OF DOVER, DELAWARE, A CORPORATION OF DELAWARE

INSERTER FOR PLACING MOLDED CHEESE IN CONTAINERS

Application filed March 19, 1931. Serial No. 523,898.

This invention relates to inserters for placing molded uncured cheese masses in containers of the valve-vented type, or the like, in which the curing of the cheese takes place in the final container in an atmosphere of the carbon dioxide generated by the cheese in curing, and from which container as much air as possible must be displaced by the cheese mass, in filling the container so as to avoid dilution of the carbon dioxide, since the latter gas is depended upon as a sterile enveloping medium to prevent the growth of undesirable bacteria in or on the cheese.

For efficient air exclusion, it seems essential that the container should be of substantially uniform cross-section and that the uncured cheese shall be molded in such shape and size as to snugly fit the walls of the container. A cheese mold capable of producing masses of cheese such as are contemplated in connection with the present invention is disclosed in my application #520,685 filed March 6, 1931.

On account of the rubbery nature of uncured cheese, the molded mass spreads somewhat upon being pressed into a container its own size, engaging the sides of the container and forming a piston, entrapping a cushion of air beneath, so that in the absence of the device of the present invention or some equivalent apparatus, it is impossible to get rid of this air cushion or to force the cheese to the bottom of the container.

The object of the present invention is to provide an inserter which shall guide the molded cheese mass into the container and at the same time provide an outlet for the air displaced as the cheese mass descends.

Other objects of the invention will appear as the following description of a preferred and practical embodiment thereof proceeds.

In the drawing in which the same characters of reference have been employed throughout the several figures are to designate identical parts.

Figure 1 is a side elevation showing the inserter being applied to a molded cheese mass.

Figure 2 is a vertical section through a container showing the cheese mass and the inserter being placed within the container.

Figure 3 is a cross section taken along the line 3—3 of Fig. 2, viewed upwardly.

Figure 4 is a fragmentary vertical section showing the mouth of a valve-vented jar, the cheese being shown in snug-fitting position within said jar.

Figure 5 is a perspective view of the inserter.

Referring now in detail to the several figures, the numeral 1 represents a molded mass of uncured cheese. In this stage it has a rubbery and somewhat spongy characteristic, being capable of some deformation, and springing back into its original shape when the deforming influence has been removed. The inserter 2 is shown partly telescoped over the molded cheese mass. The inserter in the present illustrative embodiment comprises a cylindrical band or ring 3 from which depend a plurality of fingers 4. The inserter, together with the fingers, is shown in inverted position in Figure 1, this being the preferred manner in which it is applied to the cheese mass.

The internal diameter of the ring 3 is the same as the external diameter of the mass of cheese which it encompasses and substantially the same as the internal diameter of the jar or other container into which the cheese mass is to be inserted. While it is contemplated that the container shall be cylindrical, it is permissible to make it slightly convergent but of such size that there is some intermediate point at which the cheese mass will snugly fit against the sides of the container.

The fingers 4 are shown as being slightly trough-shaped with their concave sides adjacent to the walls of the container so as to define therewith conduits when the inserter, together with the cheese mass, is inserted into the container. The fingers 4 are preferably sufficiently long to reach to the bottom of the container and are preferably resilient so as to resist the tendency of the cheese to expand radially when subjected to endwise pressure.

In operation, the inserter is slipped upon the cheese mass indicated in Fig. 1 until the uppermost end of the cheese is approximately in the same plane as the upper ends of the fingers. The inserter, together with the body of cheese, is then inverted and introduced, fingers down, into the container as shown in Fig. 2. The cheese is compressed inwardly, slightly, by the fingers 4 as shown in Figure 3, and between said fingers it assumes a compensating bulge 5 which brings it into intimate contact with the side walls of the container. The cheese together with the inserter is pressed into the container by means such as the follower 6 shown in Figure 2, and as the cheese descends the air cushion beneath it escapes upwardly through the conduits 7 formed between the fingers 4 and the walls of the container. The lower ends of the fingers are preferably formed with notches 8 affording positive communication between the air space beneath the cheese mass and the conduits. When the cheese mass has reached the bottom of the container, the follower is kept pressed down upon it while the inserter is withdrawn, preferably by the operator taking hold of the flange 9. As the inserter is withdrawn, the cheese expands radially to occupy the space vacated by the fingers.

Figure 2 shows that the container may be slightly conical, flaring somewhat toward the upper end. This is a permissible shape since the air in the wedge-shaped annulus between the cheese and container is progressively expelled by the radial expansion of the cheese under the pressure of the follower.

After the inserter has been withdrawn the cheese should uniformly engage the walls of the container not only at the bottom but all around. It is permissible to leave a very slight space such as is shown at 10 in Fig. 4 between the cheese and the lid of the container. Upon the first evolution of carbon dioxide, the air in this space will be expelled through the valved vent in the lid.

It is, of course, understood that after the container has been filled, the lid is crimped thereupon in gas-tight manner and that the pressure generated by the evolution of the carbon dioxide is relieved through the valved vent 11. This vent opens to internal pressure but closes to pressure from outside so that atmospheric air cannot enter.

While I have in the above description disclosed what I believe to be a preferred and practical embodiment of my invention, it is to be understood that the details of construction as shown and described are merely exemplary and not to be construed as limitative in their bearing upon the scope of the invention as claimed.

What I claim is:

Inserter for placing a molded cheese mass in a container which it snugly fits comprising spaced parallel resilient fingers and a support including a frame from one end of which said fingers longitudinally extend, said fingers being disposed so as to project radially inwardly substantially throughout their length, beyond the inner periphery of said frame, said support being adapted to fit freely about the molded mass while said fingers engage the sides of said mass, said fingers being trough-shaped with the channels facing outwardly and being adapted to be pressed into the surface of the cheese as the cheese with the inserter is introduced into the container, said fingers functioning both as guides for the cheese mass and as air escapes for the displaced air.

In testimony whereof I affix my signature.

CLAIR M. GERE.